United States Patent [19]
Corbiere

[11] Patent Number: 5,682,703
[45] Date of Patent: Nov. 4, 1997

[54] FISHING ROD ALARM APPARATUS

[76] Inventor: Andrew J. Corbiere, 8 McMullen Rd., Milton, Vt. 05468

[21] Appl. No.: 494,036

[22] Filed: Jun. 26, 1995

[51] Int. Cl.$^6$ .................................................. A01K 97/12
[52] U.S. Cl. ......................................... 43/17; 43/25
[58] Field of Search .......................... 43/17, 17.5, 25, 43/17.1

[56] References Cited

U.S. PATENT DOCUMENTS

| | | |
|---|---|---|
| 4,051,616 | 10/1977 | Mathauser ................................ 43/17 |
| 4,384,425 | 5/1983 | Lemons, Sr. ............................. 43/17 |
| 4,422,258 | 12/1983 | Adams et al. ........................... 43/17 |
| 4,437,255 | 3/1984 | Reed . | |
| 5,125,181 | 6/1992 | Brinton ................................... 43/17 |
| 5,261,180 | 11/1993 | Foster et al. ............................ 43/17 |
| 5,321,391 | 6/1994 | Fox ....................................... 43/17 X |
| 5,396,726 | 3/1995 | Zepeda, Sr. ............................. 43/17 |

*Primary Examiner*—Joseph J. Hail, III
*Assistant Examiner*—Jay A. Stelacone
*Attorney, Agent, or Firm*—Thomas N. Neiman

[57] ABSTRACT

The fishing rod alarm apparatus is designed to provide the user indications of pressure on the line caused by the bite of a fish. The apparatus has a molded housing that contains an alarm system and a power source. The alarm is attached to a primary pin. A metal rod controlled by a magnet is held away from the primary pin when no pressure is maintained on the fishing rod. The metal rod is in normal contact with a secondary pin via a second magnet, and the secondary pin is attached to the power source. When pressure on the fishing line causes the metal rod to come into contact with the primary pin, the circuit is completed and the alarm will sound. As the pressure is increased the metal rod will be pulled away from the secondary pin and magnet which will result in the alarm being silenced. The magnet is positioned on a moveable slide to allow for changes in wind or water conditions such as current. When pressure is released from the line the magnets will return the metal rod to its original position.

10 Claims, 2 Drawing Sheets

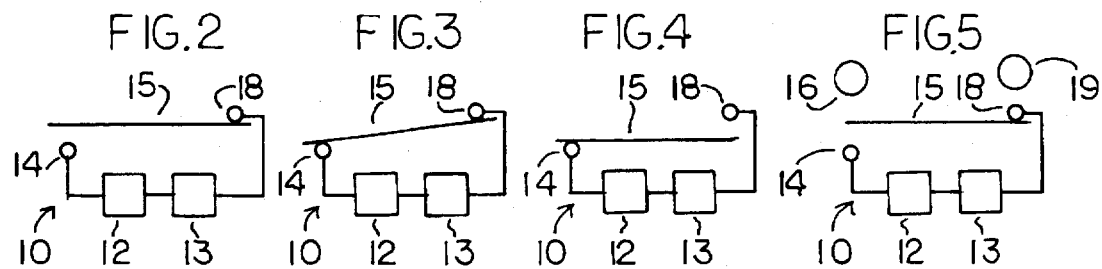
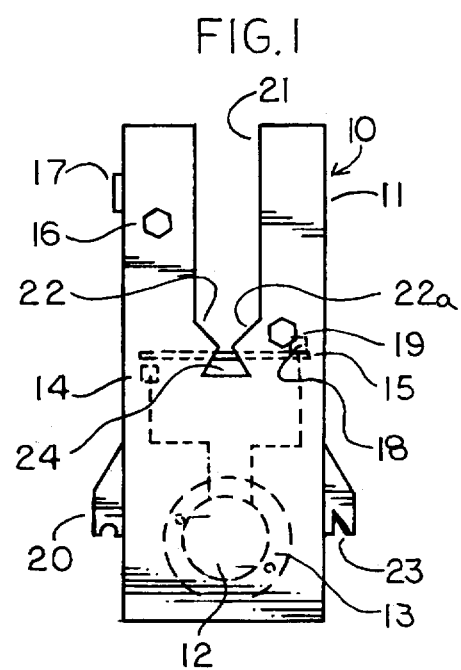
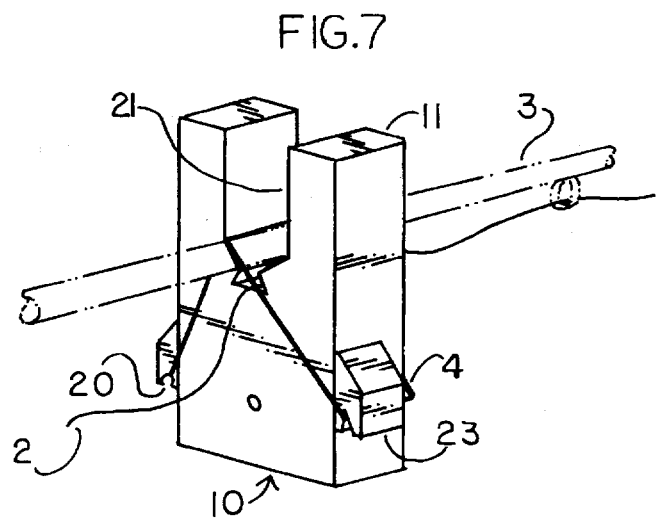

FISHING ROD ALARM APPARATUS

BACKGROUND OF THE INVENTION

This invention pertains to fishing devices, and in particular, to such fishing devices that are designed to be alarm systems that can be attached to fishing rods in order to provide notification to the individual fishing that his or her fishing line is receiving pressure.

Fishing is one of the larger recreational activities that is pursued by individuals in their spare time. Many millions of dollars are spent on devices used in this activity. Many different devices have been designed which will enable fishermen to know when they have a fish on the line. A number of attempts have been made in this area. Examples of these devices include the U.S. Pat. No. 4,471,555 issued to Dale F. Soukup on 18 Sep. 1984 for a Fishing Pole Electric Bite Indicating System and the U.S. Pat. No. 4,384,425 issued to John B. Lemons, Sr. on 24 May 1983 for a Fishing Rod Bite Signal. Both of these devices are used to measure fish strikes on fishing lines using a number of different mechanisms. They are both complicated devices that have a number of springs to accomplish the desired goals. Because of the design of these devices, they require to be reset after each contact and they tend to be large, not very sensitive and fairly expensive to produce. What is needed is an apparatus that will provide a compact, portable unit that easily can be connected to any fishing pole and provide an accurate alarm signal for the user. What is also needed is an apparatus which can be adjusted to various water and wind conditions and accurately measure actual pressure on the line. It is another object of this invention to disclose an apparatus that provides a simple tool that can be used for all fishing poles simply and easily.

It is the object of this invention to teach a fishing rod alarm apparatus which avoids the disadvantages and limitations, recited above for other fishing pole alarm systems.

SUMMARY OF THE INVENTION

Particularly, it is the object of this invention to teach a fishing rod alarm apparatus, for use by individuals to alert them to fish activity on their fishing line, comprising a control housing; said control housing having attaching means for permitting said housing to be attached to said fishing rod; said control housing further having fishing rod receiving means for permitting the user to position the fishing rod within said control housing; said control housing further having a power source; said control housing further having an alarm system attached to said power source; said alarm system comprising an alarm unit; said alarm system further comprising at least one magnetic devices for maintaining said alarm in a neutral open position until such time as pressure is applied to said fishing rod; said alarm system further comprising at least one pin for being a contact section of the entire electrical circuit; said alarm further comprising a secondary pin for being another contact section of said entire electrical circuit; said alarm system further comprising a metallic rod for permitting the opening and closing of an electrical circuit by coming into or out of contact with said primary and secondary pins; and said alarm system further comprising an adjustment system for allowing the user to adjust said fishing rod alarm apparatus for changing water and wind conditions.

BRIEF DESCRIPTION OF THE INVENTION

Further objects and features of this invention will become more apparent by reference to the following description taken in conjunction with the following figures, in which:

FIG. 1 is a front elevational view of the novel fishing rod alarm apparatus;

FIG. 2 is a circuit diagram showing the apparatus with no pressure on the fishing rod;

FIG. 3 is a circuit diagram showing the apparatus with light pressure on the fishing rod;

FIG. 4 is a circuit diagram showing the apparatus with heavy pressure on the fishing rod;

FIG. 5 is a circuit diagram showing the magnet pulls on the metal rod;

FIG. 7 is a perspective view of the novel apparatus attached to a fishing pole with the line inserted.

DESCRIPTION OF THE PREFERRED EMBODIMENTS

Figure 6:
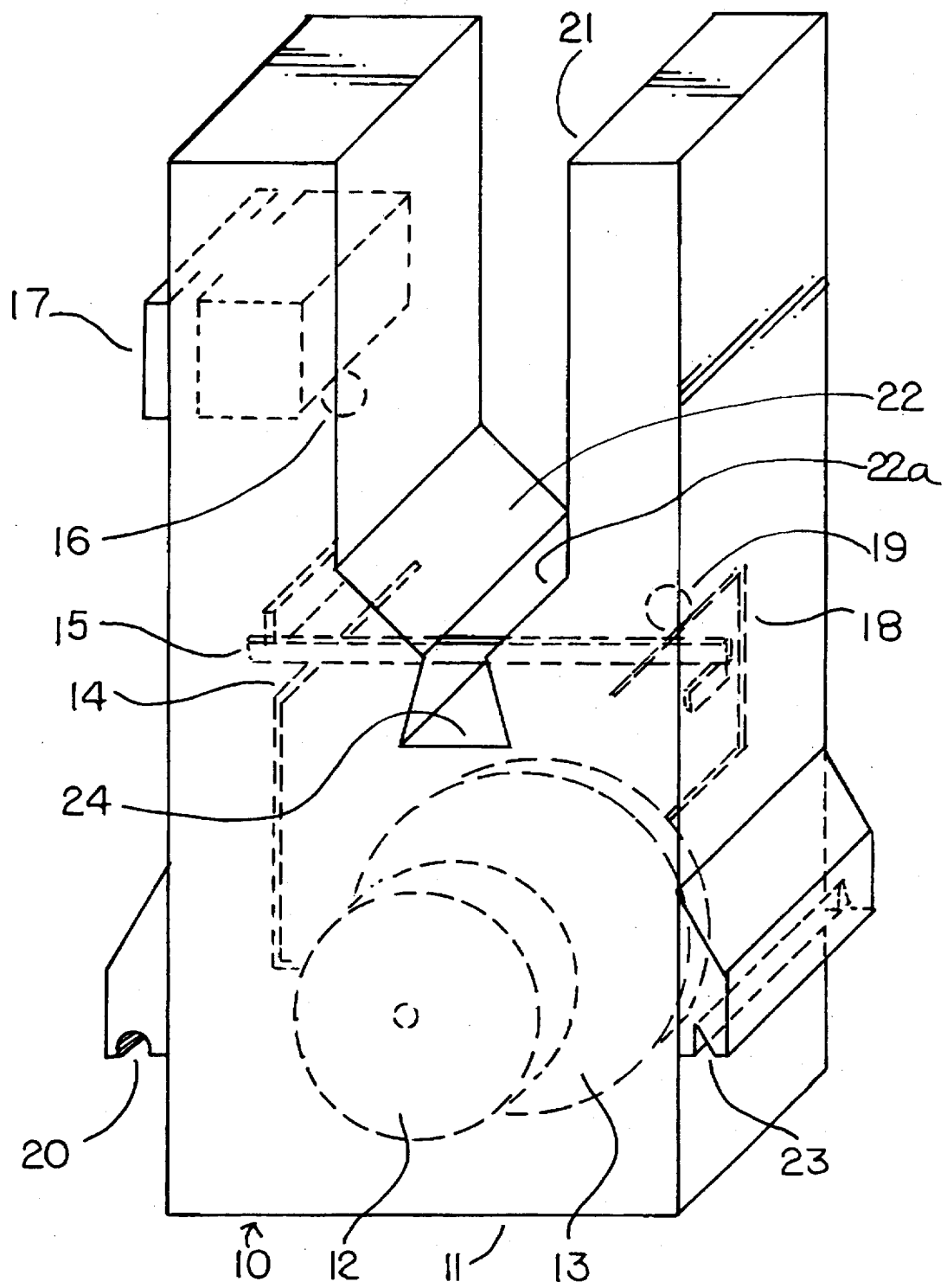
FIG. 6 is a perspective view of the novel apparatus.

As shown in the figures, the novel fishing rod alarm apparatus 10 comprises an injected molded housing 11 that contains an alarm unit 12 that is attached to a battery power source 13. This is accomplished by connecting the negative terminal on the alarm unit 12 to the negative terminal on the battery 13. The positive terminal on the alarm 12 is connected to a primary pin 14. A metal rod 15, constructed of a magnetic metal, is held away from the primary pin 14 by means of a primary magnet 16 which is seated on an adjustable slide unit 17. The other end of the metal rod 15 is held in contact with secondary pin 18 by means of secondary magnet 19. The secondary pin 18 is connected to the positive terminal of the battery 13.

When the apparatus is not in use, or when no pressure is being applied to the metal rod 15, the metal rod 15 is not in contact with primary pin 14 and the circuit is open as shown in FIG. 2 and FIG. 5. When sufficient pressure is applied to the metal rod 15 by means of the fishing line 2 and this pressure overcomes the magnetic force exerted by primary magnet 16, the metal rod 15 comes in contact with primary pin 14 and the circuit is closed and the alarm unit 12 will activate (either sound or light). As the pressure is increased, when a fish is reeled in, the metal rod 15 will be pulled away from secondary pin 18 and secondary magnet 19, thereby opening the circuit and deactivating the alarm 12. When the pressure is removed from the line 2, the force exerted by the magnets 16 and 19, will reposition the metal rod 15 in its original position.

A number of changing conditions can effect the operation of the apparatus 10 and an adjustment system is used. Examples of changing water and wind conditions include water current and tides and significant winds. To give the system flexibility, the primary magnet 16 is set on an adjustable slide unit so that the magnet can be moved away from the metal rod 15 when there are no wind or water problems thereby requiring less pressure on the metal rod 15 to allow it to make contact with primary pin 14. When there are wind or water problems, the primary magnet 16 can be moved closer to the metal rod 15, requiring more line pressure to overcome the force exerted by the primary magnet 16. The primary magnet 16 is always located farther away from the metal rod 15 than the secondary magnet 19 in order to insure that line pressure will put the metal rod 15 in contact with the primary pin 14 before the metal rod will disengage from the secondary pin 18. It would also be possible to have an alternate embodiment with the adjustable slide magnet to be closer to the metal rod than the secondary magnet. In this position the metal rod would be pulled away from the secondary pin first which will result in an incomplete circuit. This would be a true off position which would come into play when the user was pulling in a small fish or when the fish was being taken off the hook. An on and off switch could also be added to the apparatus, in which case the secondary pin and magnet would not be required. It is also feasible to have the primary magnet in a fixed position without taking away from the scope of the invention.

The fisherman would connect the apparatus 10 to the fishing pole 3 by means of an elastic band 4 that is inserted into a closed loop 20 on the side of the housing 11. The fishing pole is positioned within a "U" shaped area 21 in the top side of the housing 11 and rests on angled supports 22 and 22a. The elastic band goes over the fishing pole 3 and then is inserted into a "V" shaped slot 23 on the opposite side of the housing from the closed loop side. The fishing line 2 fits into the small aperture 24 located underneath the angled supports 22 and 22a. The design of these features allows for easy attachment or removal of the apparatus from the fishing pole. Alternate means to attach the apparatus to the fishing pole and having the line positioned are also available, such as a fabric material hook and loop devices or clamps.

While I have described my invention in connection with specific embodiments thereof, it is clearly to be understood that this is done only by way of example and not as a limitation to the scope of my invention as set forth in the objects thereof and in the appended claims.

I claim:

1. A fishing rod alarm apparatus, for use by individuals to alert them to fish activity on their fishing line, comprising:

a control housing;

said control housing having attaching means for attaching said housing to a fishing rod;

said control housing further having fishing rod receiving means for guiding the user to position said fishing rod within said control housing;

said control housing further having a power source;

said control housing further having an alarm system attached to said power source;

said alarm system comprising an alarm unit;

said alarm system further comprising a primary magnetic device for maintaining said alarm system in a neutral open position until such time as pressure is applied to the fishing line;

said alarm system further comprising a secondary magnetic device for maintaining said alarm system in a neutral closed position until enough pressure is applied to the fishing line to deactivate said alarm system;

said alarm system further comprising a primary pin for being a contact section of an electrical circuit;

said alarm system further comprising a secondary pin for being another contact section of the electrical circuit;

said alarm system further comprising a metallic rod for permitting the opening and closing of the electrical circuit by coming into and out of contact with said primary and secondary pins;

said alarm system further comprising an adjustment system for allowing the user to adjust said fishing rod alarm apparatus for various water and wind conditions;

said adjustment system for said fishing rod alarm apparatus comprising an adjustable slide; and said adjustable slide comprising means for moving said primary magnetic device closer or farther away from said metallic rod as wind or water conditions require.

2. A fishing rod alarm apparatus, according to claim 1, wherein:

said control housing comprises a housing made of plastic materials; and said control housing further comprises an injected molded unit.

3. A fishing rod alarm apparatus, according to claim 1, wherein:

said attaching means comprise first means that consists of a closed loop slot on one side of said control housing for permitting an elastic band to be inserted therein, and second means that consists of a "V" shaped slot on a side opposite said first means for permitting said elastic band to be inserted therein for ease of attaching or removing of said fishing rod alarm apparatus to the fishing rod.

4. A fishing rod alarm apparatus, according to claim 1, wherein:

said fishing rod receiving means comprises a "U" shaped cutout within said control housing for permitting the fishing rod to be positioned therein;

said "U" shaped cutout has angled resting supports upon which the fishing rod sits; and said "U" shaped cutout has an aperture located below said angled resting supports for permitting said fishing line to be passed through.

5. A fishing rod alarm apparatus, according to claim 1, wherein:

said power source of said fishing rod alarm apparatus comprises a battery unit.

6. A fishing rod alarm apparatus, according to claim 1, wherein:

said alarm unit of said fishing rod alarm apparatus comprises a signal device; and said signal device has circuit means attaching said signal device to said power source.

7. A fishing rod alarm apparatus, according to claim 1, wherein:

said primary and secondary magnetic devices comprise first magnetic means for determining the existence of pressure on said fishing line by providing an adjustable amount of resistance that said alarm system has to overcome to close said electrical circuit, and secondary magnetic means for opening said electrical circuit when the pressure on said fishing line exceeds a predetermined limit.

8. A fishing rod alarm apparatus, according to claim 1, wherein:

said primary pin comprises means constructed of metal composition.

9. A fishing rod alarm apparatus, according to claim 1, wherein:

said secondary pin comprises means constructed of metal composition.

10. A fishing rod alarm apparatus, according to claim 1, wherein:

said metallic rod comprises means for connecting with and disconnecting with said primary pin and said secondary pin at opposite ends of said metallic rod.

* * * * *